United States Patent [19]

D'Alfonso et al.

[11] Patent Number: 5,398,944
[45] Date of Patent: Mar. 21, 1995

[54] SEALING SYSTEM FOR RECIPROCATING ROD

[75] Inventors: G. Christopher D'Alfonso, Beverly; Michael P. Grimanis, Wayland, both of Mass.

[73] Assignee: A. W. Chesterton Co., Stoneham, Mass.

[21] Appl. No.: 986,332

[22] Filed: Dec. 7, 1992

[51] Int. Cl.⁶ .......................... E21B 33/00; F16J 15/56
[52] U.S. Cl. ...................... 277/123; 277/17; 277/70; 277/105; 166/84
[58] Field of Search .................. 277/58, 59, 60, 70, 277/72 FM, 77, 104, 105, 106, 116.2, 116.4, 123, 183, 187, 193, 212 F, 17, 18, 19; 166/82, 84

[56] References Cited

U.S. PATENT DOCUMENTS

| | | | |
|---|---|---|---|
| 1,809,657 | 6/1931 | Weant | 277/17 |
| 2,119,033 | 2/1937 | Andrew . | |
| 2,608,424 | 8/1952 | Everett . | |
| 2,853,321 | 9/1958 | Davey . | |
| 2,857,183 | 10/1958 | Tschappat . | |
| 2,897,785 | 8/1959 | Ortman | 277/35 |
| 3,559,539 | 2/1971 | Nagy | 277/187 |
| 3,577,833 | 5/1971 | Skelton | 277/187 |
| 3,787,060 | 1/1974 | Astill et al. . | |
| 3,968,970 | 7/1976 | Vogeli . | |
| 4,283,062 | 8/1981 | Calanzaro et al. | 277/105 |
| 4,345,766 | 8/1982 | Turanyi . | |
| 4,582,329 | 4/1986 | Stalph . | |
| 4,640,305 | 2/1987 | Johnson . | |
| 4,647,050 | 3/1987 | Johnson | 277/59 |
| 4,765,631 | 8/1988 | Kohner et al. | 277/77 |
| 4,896,367 | 1/1990 | Newton et al. . | |
| 5,071,139 | 12/1991 | Warner . | |
| 5,129,625 | 7/1993 | Wood et al. | 277/59 |

Primary Examiner—Daniel G. DePumpo
Attorney, Agent, or Firm—Hill, Steadman & Simpson

[57] ABSTRACT

The stuffing box of the present invention includes a seal housing surrounding the polished rod. A V-ring set is mounted in sealing contact with the polished rod, and concentrically surrounds the polished rod within the seal housing. A compression ring is mounted in the seal housing, and includes a first end in contact with the V-ring set, and a second end disposed in proximity with an end face of the seal housing. An annular cylindrical non-metallic bearing having an interior surface in concentric contact with the polished rod is generally concentrically mounted within the compression ring. The bearing is adapted to maintain the V-ring set and the polished rod in concentric alignment. A first annular flange member is mounted on the end face of the seal housing. The first annular flange member surrounds the polished rod, and is mounted in contact with the second end of the compression ring. An annular cylindrical pipe section can be mounted on the first flange member in a position surrounding the polished rod, and a second annular flange member can be mounted on an end of the pipe section opposite the first flange member. At least one connecting member is provided to secure the first flange member to the second flange member. A wiper collar assembly can be mounted on the second flange member in concentric contact with the polished rod. The stuffing box can include a selectively actuable shut-off seal disposed within the seal housing.

17 Claims, 2 Drawing Sheets

SEALING SYSTEM FOR RECIPROCATING ROD

TECHNICAL FIELD

The present invention relates to stuffing boxes for use with oil field pumping units, and specifically to a stuffing box having multiple seal elements.

BACKGROUND OF THE INVENTION

In oil fields, there are many instances in which crude oil does not flow freely under its own pressure from wells. In such cases, artificial "lift" methods utilize a reciprocating polished rod with a plunger down-hole to move the fluid out of the ground and into storage tanks. The equipment (pump unit) which drives the reciprocating rod takes on various forms, the most widely used is a pump jack. A seal system called a stuffing box is used to prevent fluid leakage at the point where the rod enters the ground.

Many known seal units rely upon the contained well fluid to provide both cooling and lubrication for the stuffing box. However, well fluids are often produced at high temperatures or with entrained abrasive material. In some wells, the produced fluid is extremely corrosive. Such adverse conditions sometimes require frequent replacement of the fluid seals.

Furthermore, the movement of the surface pumping unit or misalignment of the rod can tend to cause the reciprocating polished rod to be moved out of longitudinal alignment with the seals, thereby causing uneven wear and premature seal failure. It is therefore important to maintain the polished rod in concentric longitudinal alignment with the seals contained in the stuffing box.

SUMMARY OF THE INVENTION

The present invention provides a stuffing box for use with a pump unit including a reciprocating rod that has an extended service life, is able to withstand the rigors of the oil field environment, and is easily serviceable.

The stuffing box of the present invention includes a seal housing surrounding the polished rod. A V-ring set is mounted in sealing contact with the polished rod, and concentrically surrounds the polished rod within the seal housing.

A compression ring is mounted in the seal housing, and includes a first end in contact with the V-ring set, and a second end disposed in proximity with an end face of the seal housing.

An annular cylindrical non-metallic bearing having an interior surface in concentric contact with the polished rod is generally concentrically mounted within the compression ring. The bearing is adapted to maintain the V-ring set and the polished rod in concentric alignment.

A first annular flange member is mounted on the end face of the seal housing. The first annular flange member surrounds the polished rod, and is mounted in contact with the second end of the compression ring.

An annular cylindrical pipe section can be mounted on the first flange member in a position surrounding the polished rod, and a second annular flange member can be mounted on an end of the pipe section opposite the first flange member. At least one connecting member is provided to secure the first flange member to the second flange member.

A wiper collar assembly can be mounted on the second flange member in concentric contact with the polished rod.

The stuffing box can include a selectively actuable shut-off seal disposed within the seal housing. The shut-off seal may include an annular recess in the housing surrounding the polished rod, with an O-ring disposed within the annular recess. The O-ring divides the recess into inner and outer concentric chambers. A radial passage leads from the annular recess to an exterior surface of the housing. A fitting can be disposed in the radial passage adjacent to the exterior surface of the seal housing. With the shut-off seal, pressurized fluid can be selectively introduced through the fitting and the radial passage into the outer concentric chamber to urge the O-ring into sealing contact with the polished rod.

The compression ring can include generally cylindrical inner and outer surfaces. An annular outer chamber can be formed adjacent to the outer cylindrical surface, and an annular inner chamber formed adjacent to the inner cylindrical surface, with at least one radial passage connecting the annular outer chamber to the annular inner chamber. A passage may be provided in the seal housing to provide good communication with the annular outer chamber of the compression ring, with a lubrication fitting closing the passage.

The bearing can be mounted in an annular recess of the compression ring, and on a stop shoulder thereof.

The first and second flange members, the pipe section, and the seal housing can be centered in concentric alignment with one another using a series of interengageable flanges and recesses.

The wiper collar assembly can include a wiper collar secured to the second flange member. The wiper collar may be provided with a central aperture adapted to allow the polished rod to pass therethrough. A wiper element is secured between the wiper collar and the second flange member. The wiper element is adapted and positioned to wipe the outer surface of the polished rod as the polished rod reciprocates.

Other objects and advantages of the present invention will be apparent upon reference to the accompanying description when taken in conjunction with the following drawings.

DETAILED DESCRIPTION OF THE PREFERRED EMBODIMENT

Figure 1:
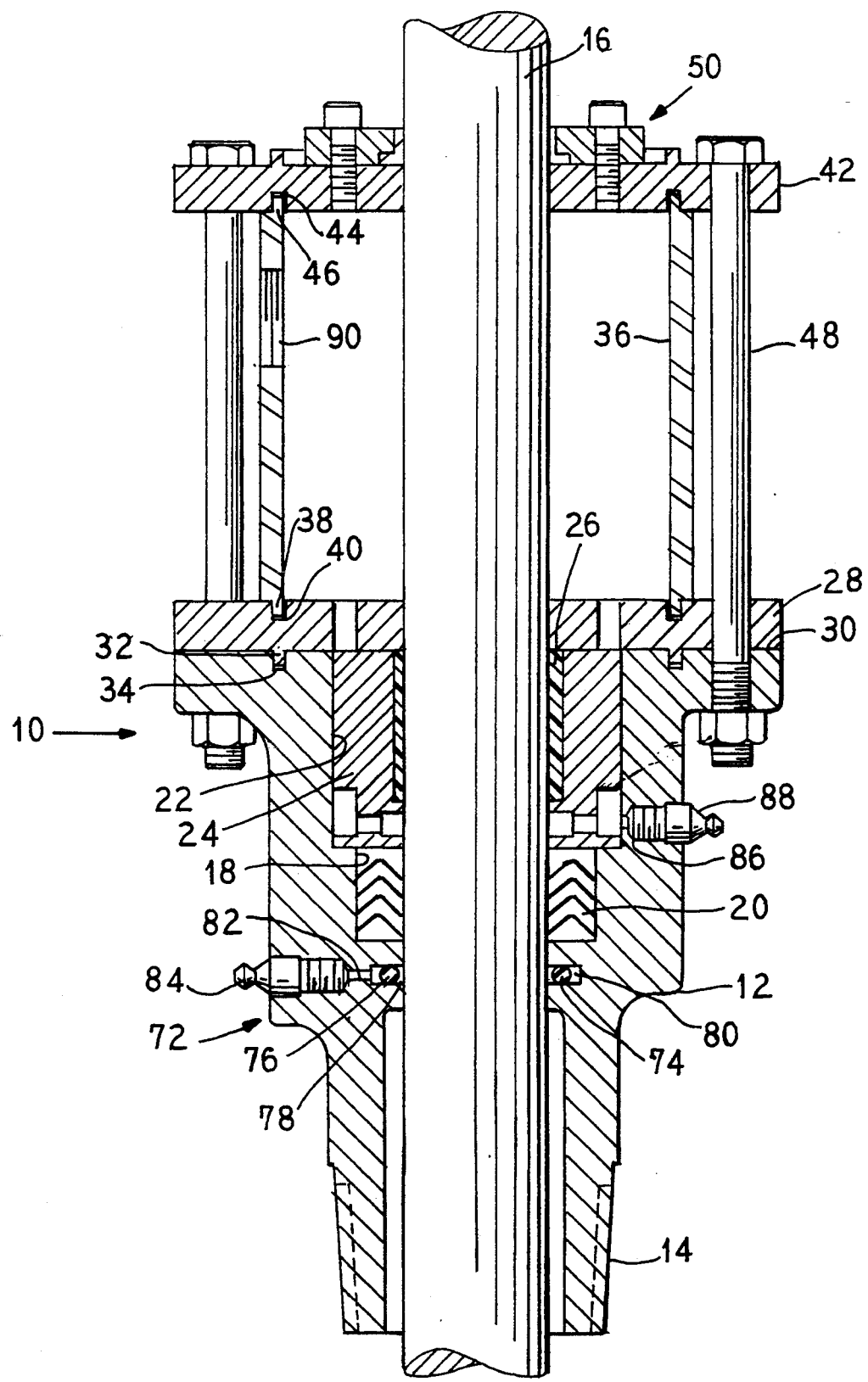
FIG. 1 illustrates a sectional view of a stuffing box embodying the principles of the present invention.

FIG. 1 illustrates a sectional view of a stuffing box 10 embodying the principles of the present invention. The stuffing box 10 includes a seal housing 12 having a threaded housing end 14 for connection to the well head. A polished rod 16 passes centrally through the seal housing 12.

The seal housing 12 is provided with a first step bore 18 which houses the primary seal, a V-ring set 20 in the illustrated embodiment. The ring sets are exemplified by the A. W. Chesterton Style 8000 Super Parachute, although any suitable primary seal members could be provided.

The seal housing 12 is provided with a second stepped bore 22 in which is provided a compression ring 24. An annular cylindrical non-metallic bearing 26 is provided in the compression ring 24, as will be described in detail hereinbelow.

A first annular flange member 28 is provided on an end face 30 of the seal housing 12. The first flange member 28 includes a projection 32 that is adapted to be received into a recess 34 in the seal housing end face 30. Interengagement of the projection 32 and the recess 34 centers the first flange member 28 on the seal housing end face 30.

A pipe section 36 includes a projection 38 that is adapted to be received into a recess 40 on the first flange member 28. When the pipe section 36 is mounted on the first flange member 28, the projection 38 interengages with the recess 42 to center the pipe section 36 on the first flange member 28. The pipe section 36 can be filled with a lubricant, for example oil, and thus serves as a lubrication reservoir to lubricate the polished rod 16 as it reciprocates. Lubricant from the pipe section 36 is allowed to work its way into the seals and bearing, which reduces friction and thereby decreases the temperature and wear of the seals and bearing.

The pipe section 36 is capped by a second annular flange member 42. The second flange member 42 includes a recess 44 that is adapted to receive a projection 46 on the pipe section 36. Interengagement of the recess 44 and projection 46 serves to center the second flange member 42 with respect to the pipe section 36. A plurality of connecting rods 48 are provided to secure the second flange member 42 and the pipe section 36 to the first flange member 28 and the seal housing 12.

Figure 2:
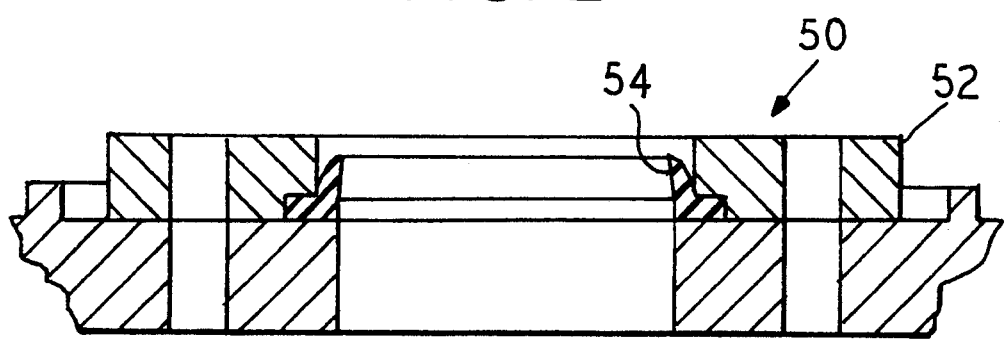
FIG. 2 illustrates a sectional view of a wiper collar assembly.

A wiper collar assembly 50 is mounted on the second flange member 42 in concentric contact with the polished rod 16. As shown in FIG. 2, the wiper collar assembly 50 includes a wiper collar 52 and a flexible wiper element 54. The flexible wiper element 54 interacts with the surface of the polished rod 16 during reciprocation to prevent dirt and abrasive material from entering the stuffing box 10. The wiper element 54 is secured between the wiper collar 52 and the second flange member 42. It is also contemplated that an environmental vessel (not shown) could be secured to the pipe section 36 via the port 90.

Figure 3:
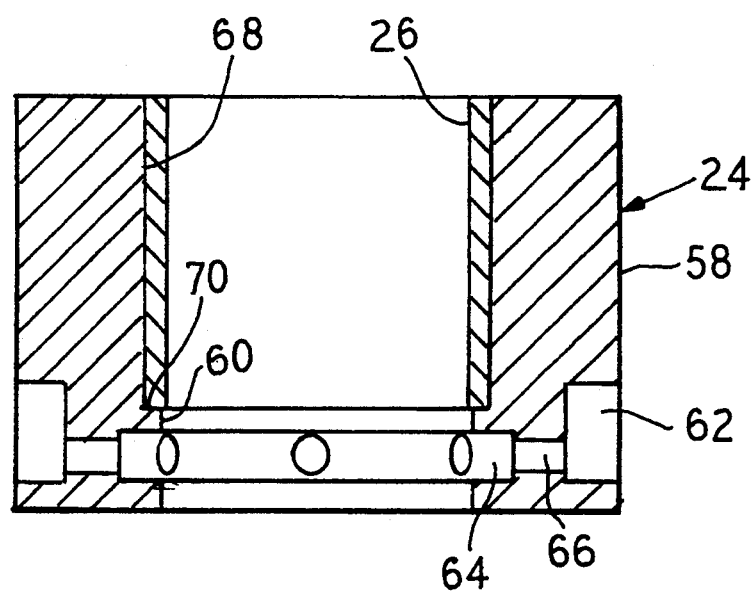
FIG. 3 illustrates a sectional view of a compression ring and bearing.

FIG. 3 illustrates a detailed sectional view of the compression ring 24 and bearing 26. The compression ring 24 includes a generally cylindrical outer surface 58 and a generally cylindrical inner surface 60. An outer annular chamber 62 is formed adjacent to the outer cylindrical surface 58, and an inner annular chamber 64 is provided adjacent to the inner cylindrical surface 60. A plurality of radial passages 66 connect the outer annular chamber 62 with the inner annular chamber 64.

The compression ring 24 also includes an annular recess 68 formed on the inner cylindrical surface 60. The annular recess 68 terminates in a stop shoulder 70. When the bearing 26 is mounted in a compression ring 24, the bearing 26 is in abutment with the stop shoulder 70.

The stuffing box 10 also includes a shut-off seal 72, as shown in FIG. 1. The shut-off seal 72 is constructed and operates in accordance with the seal disclosed in U.S. Pat. No. 5,071,139. The shut-off seal 72 includes an annular recess 74 in the seal housing 12. An O-ring 76 is disposed within the annular recess 74, and divides the recess 74 into inner and outer concentric chambers 78, 80. A radial passage 82 leads from the outer chamber 80 to an exterior surface of the seal housing 12. The radial passage 82 is closed by a grease fitting 84. The shut-off seal 72 uses hydraulic pressure from, for example, a grease gun to compress the O-ring 76 against the polished rod 16, thereby producing a seal between the rod and the housing. The shut-off seal 72 can be used to maintain the polished rod 16 in a sealed condition when the polished rod is stationary, thereby permitting replacement or servicing of other components of the stuffing box 10.

As can be seen in FIG. 1, a passage 86 leads from the exterior of the seal housing 12 to the outer annular chamber 62 of the compression ring 24. The passage 86 is closed with a fitting 88, for example a grease fitting. Additional lubricant, for example grease, can be introduced into the interface between the polished rod 16 and the bearing 26 and compression ring 24 through the fitting 88, the passage 86, the outer annular chamber 62 of the compression ring 24, the radial passages 66 of the compression ring 24, and the inner annular chamber 64 of the compression ring 24.

The bearing 26 is maintained in concentric relation to the polished rod 16 by the compression ring 24. Since the compression ring 24 is in contact with the V-ring set 20, the bearing also serves to maintain alignment between the polished rod and the V-ring set 20. The connecting rods 48 and flange 28 exert pressure on the compression ring 24, which in turn serves to set the V-ring set to the proper height, thus maintaining proper sealing relationship with the polished rod 16. Since the bearing and sealing arrangement of the stuffing box 10 serves to maintain proper alignment and seal contact, the life of the seals and efficacy of the stuffing box 10 are greatly enhanced. Furthermore, the V-ring set acts as a wiper to prevent abrasive material from entering the seal and bearing areas during upstroke of the polished rod 16. The relationship between the non-metallic bearing 26 and the polished rod 16 also prevents axial loading from affecting the positioning of the seals and their ability to perform affectively. The modular design of the stuffing box 10 allows for additional lubrication capacity if needed, for example, by increasing the height of the pipe section 36. The integral shut-off seal 72 greatly enhances the speed and convenience of stuffing box servicing.

Although the present invention has been described with reference to a specific embodiment, those of skill in the art will recognize that changes may be made thereto without departing from the scope and spirit of the invention as set forth in the appended claims.

We claim as our invention:

1. A stuffing box for use with a pump unit driving a down-hole plunger for lifting a fluid and which includes a reciprocating polished rod, said stuffing box comprising the following:
   a seal housing surrounding the polished rod;
   a V-ring set in sealing contact with the polished rod, said V-ring set being mounted concentrically surrounding the polished rod within said seal housing;
   a compression ring mounted in said seal housing, said compression ring including a first end in contact with said V-ring set and a second end disposed in proximity with an end face of said seal housing;
   an annular cylindrical non-metallic bearing having an interior surface in concentric contact with the polished rod, said bearing being generally concentrically mounted within said compression ring and adapted to maintain said V-ring set and the polished rod in concentric alignment;

a first annular flange member mounted on said end face of said seal housing, said first flange member being mounted in contact with said second end of said compression ring in a position surrounding the polished rod;

an annular cylindrical pipe section for holding lubricating oil for the polished rod, having a fill port, and mounted on said first flange member in a position surrounding the polished rod;

a second annular flange member mounted on an end of said pipe section opposite said first flange member in a position surrounding the polished rod;

at least one connecting member securing said first flange member to said second flange member; and a wiper collar assembly mounted on said second flange member in concentric contact with the polished rod, said pipe section, said wiper collar assembly and said first and second annular flange members defining a lubricating oil reservoir remote from said down-hole plunger.

2. A stuffing box according to claim 1, further comprising a selectively actuable shut-off seal disposed within said seal housing.

3. A stuffing box according to claim 2, wherein said shut-off seal comprises the following:

an annular recess, in said seal housing, surrounding the polished rod;

an O-ring disposed within said annular recess, said O-ring dividing said recess into inner and outer concentric chambers;

a radial passage leading from said annular recess to an exterior surface of said seal housing; and a fitting disposed in said radial passage adjacent to said exterior surface of said seal housing;

whereby pressurized fluid can be selectively introduced through said fitting and said radial passage into said outer concentric chamber to urge said O-ring into sealing contact with the polished rod.

4. A stuffing box according to claim 1, wherein said compression ring comprises the following:

a generally cylindrical outer surface;

a generally cylindrical inner surface;

an annular outer chamber formed adjacent to said outer cylindrical surface;

an annular inner chamber formed adjacent to said inner cylindrical surface; and at least one radial passage connecting said annular outer chamber to said annular inner chamber.

5. A stuffing box according to claim 4, wherein said seal housing includes a passage leading from an exterior of said seal housing to said annular outer chamber of said compression ring, said passage being closed at said exterior of said housing by a fitting member.

6. A stuffing box according to claim 4, wherein said compression ring further comprises an annular recess formed on said cylindrical inner surface, said recess terminating in a stop shoulder.

7. A stuffing box according to claim 6, wherein said annular cylindrical bearing is mounted in said annular recess of said compression ring in abutment with said stop shoulder.

8. A stuffing box according to claim 1, wherein said end face of said seal housing includes a recess, and said first flange member includes a projection adapted to be received into said recess in said seal housing end face, whereby said first flange member is centered on said seal housing end face by the interengagement of said projection and said recess.

9. A stuffing box according to claim 1, wherein said first flange member includes a recess on a side of said first flange member opposite said V-ring set, and said pipe section includes a projection adapted to be received into said recess in said first flange member, whereby said pipe section is centered on said first flange member by the interengagement of said projection and said recess.

10. A stuffing box according to claim 1, wherein said second flange member includes a recess on a surface thereof, and said pipe section includes a projection adapted to be received into said recess in said second flange member, whereby said pipe section is centered on said second flange member by the interengagement of said projection and said recess.

11. A stuffing box according to claim 1, wherein said wiper collar assembly includes the following:

a wiper collar secured to said second flange member, said wiper collar having a central aperture adapted to allow the polished rod to pass therethrough; and a wiper element secured between said wiper collar and said second flange member, said wiper element being adapted and positioned to wipe the outer surface of the polished rod as the polished rod reciprocates.

12. A stuffing box for use with a pump unit driving a down-hole plunger for lifting a fluid which includes a reciprocating polished rod, said stuffing box comprising the following:

a seal housing surrounding the polished rod;

a V-ring set in sealing contact with the polished rod, said V-ring set being mounted within said seal housing;

a compression ring mounted in said seal housing, said compression ring including a first end in contact with said V-ring set and a second end disposed in proximity with an end face of said seal housing;

an annular cylindrical bearing having an interior surface in concentric contact with the polished rod, said bearing being generally concentrically mounted within said compression ring;

a first annular flange member bolted to said end face of said seal housing capturing said compression ring therein, said polished rod penetrating said first annular flange member;

a lubricating oil reservoir extending upwardly from said annular flange member, and surrounding said polished rod;

a selectively actuatable shut-off seal disposed within said seal housing;

wherein said shut-off seal comprises the following:

an annular recess, in said seal housing, surrounding the polished rod;

an O-ring disposed within said annular recess, said O-ring dividing said recess into inner and outer concentric chambers;

a radial passage leading from said annular recess to an exterior of said seal housing; and a fitting disposed in said radial passage adjacent to said exterior surface of said seal housing;

whereby pressurized fluid can be selectively introduced through said fitting and said radial passage into said outer concentric chamber to urge said O-ring into sealing contact with the polished rod; and wherein said reservoir comprises:

an annular cylindrical pipe section mounted on said first flange member in a position surrounding the polished rod;

a second annular flange member mounted on an end of said pipe section opposite said first flange member in a position surrounding the polished rod;

at least one connecting member securing said first flange member to said second flange member; and a wiper collar assembly mounted on said second flange member in concentric contact with the polished rod.

13. A stuffing box according to claim 12, wherein said compression ring comprises the following:
   a generally cylindrical outer surface;
   a generally cylindrical inner surface;
   an annular outer chamber formed adjacent to said outer cylindrical surface;
   an annular inner chamber formed adjacent to said inner cylindrical surface; and
   at least one radial passage connecting said annular outer chamber to said annular inner chamber.

14. A stuffing box according to claim 13, wherein said seal housing includes a passage leading from an exterior of said seal housing to said annular outer chamber of said compression ring, said passage being closed at said exterior of said housing by a fitting member.

15. A stuffing box according to claim 13, wherein said compression ring further comprises an annular recess formed on said cylindrical inner surface, said recess terminating in a stop shoulder.

16. A stuffing box according to claim 15, wherein said annular cylindrical bearing is mounted in said annular recess of said compression ring in abutment with said stop shoulder.

17. A stuffing box according to claim 12 wherein said wiper collar assembly includes the following:
   a wiper collar secured to said second flange member, said wiper collar having a central aperture adapted to allow the polished rod to pass therethrough; and
   a wiper element secured between said wiper collar and said second flange member, said wiper element being adapted and positioned to wipe the outer surface of the polished rod as the polished rod reciprocates.

* * * * *